(12) United States Patent
Bancroft et al.

(10) Patent No.: US 6,938,879 B2
(45) Date of Patent: Sep. 6, 2005

(54) VALVE SEAL WITH PRESSURE RELIEF CHANNELS AND EXPANSION VOIDS

(75) Inventors: Philip W. Bancroft, Belvidere, NJ (US); Richard R. Weston, Nazareth, PA (US); Steven A. Wortmann, Easton, PA (US)

(73) Assignee: Victaulic Company of America, Easton, PA (US)

( * ) Notice: Subject to any disclaimer, the term of this patent is extended or adjusted under 35 U.S.C. 154(b) by 30 days.

(21) Appl. No.: 10/635,087

(22) Filed: Aug. 6, 2003

(65) Prior Publication Data

US 2005/0029483 A1 Feb. 10, 2005

(51) Int. Cl.[7] .............................................. F16K 1/226
(52) U.S. Cl. ..................... 251/306; 277/460; 277/465
(58) Field of Search .............................. 277/641, 649, 277/644, 459, 460, 464, 465, 514; 251/306, 307, 173

(56) References Cited

U.S. PATENT DOCUMENTS

| | | | |
|---|---|---|---|
| 2,982,305 A | 5/1961 | Grove ................... 137/614.11 |
| 3,304,050 A | 2/1967 | Fawkes ....................... 251/306 |
| 3,409,269 A * | 11/1968 | Fawkes ....................... 251/306 |
| 3,540,696 A | 11/1970 | Fawkes ....................... 251/306 |
| 3,544,066 A | 12/1970 | Fawkes ....................... 251/306 |
| 3,726,503 A | 4/1973 | Fawkes ....................... 251/173 |
| 3,799,501 A | 3/1974 | Hartman ..................... 251/306 |
| 3,895,815 A * | 7/1975 | Panigati ....................... 277/460 |
| 4,005,848 A | 2/1977 | Eggleston ................... 251/173 |
| 4,195,815 A * | 4/1980 | Stager ......................... 251/173 |
| 4,220,172 A * | 9/1980 | Stager ......................... 251/306 |
| 4,289,296 A | 9/1981 | Krause ........................ 251/306 |
| 4,304,392 A | 12/1981 | Maciulaitis ................. 251/173 |
| 4,385,747 A * | 5/1983 | Renaud et al. .............. 277/644 |
| 4,410,163 A | 10/1983 | Scobie et al. ............... 251/306 |
| 4,681,326 A * | 7/1987 | Kubo ........................... 277/464 |
| 4,796,857 A | 1/1989 | Hayes et al. ................ 251/173 |
| 6,045,121 A | 4/2000 | Barker et al. ............... 251/306 |
| 6,202,983 B1 | 3/2001 | Hartman et al. ............ 251/306 |
| 6,206,376 B1 | 3/2001 | Hartman et al. ............ 277/314 |

\* cited by examiner

*Primary Examiner*—John Bastianelli
(74) *Attorney, Agent, or Firm*—Synnestvedt & Lechner LLP (57) ABSTRACT

A flexible, resilient incompressible seal for a butterfly valve is disclosed formed from a loop having a perimeter mounting surface and a perimeter sealing surface with first and second oppositely disposed axial surfaces extend between the perimeter sealing and mounting surfaces. Channels are positioned in the axial surfaces in spaced relation around the seal. The channels extend from the perimeter mounting surface toward the perimeter sealing surface and provide fluid communication to the perimeter mounting surface allowing fluid trapped against the perimeter mounting surface to escape when compressed by the closing of the valve. A void space is positioned in the perimeter mounting surface in the form of grooves or dimples allowing the perimeter sealing surface to deform under compression when the seal is captured within the valve and substantially restrained from deforming.

74 Claims, 10 Drawing Sheets

VALVE SEAL WITH PRESSURE RELIEF CHANNELS AND EXPANSION VOIDS

FIELD OF THE INVENTION

This invention relates to seals for use with valves and especially to seals adapted for use with butterfly valves.

BACKGROUND OF THE INVENTION

Valves, such as butterfly valves, having valve closing members rotatably mounted within a housing to effect opening and closing of the valve, are in widespread use throughout a wide spectrum of industrial and commercial activities including the chemical and petroleum industries, the papermaking industry, municipal and industrial water service and in commercial and residential fire suppression systems to cite a few examples.

Butterfly valves and the like often have a flexible, resilient seal mounted within the valve housing and surrounding the closure member. The seal provides a compliant, deformable interface between the valve closing member and the valve housing which effects a fluid tight seal when the closure member is rotated from the open to the closed position to compressively engage the seal.

Butterfly valves may be used to control fluids flowing under high pressure and temperature, for example, in excess of 20 atmospheres and above 200° F. Such conditions are very hard on the valve and will cause degradation unless steps are taken to protect the valve components. Especially troubling are conditions, such as large fluid temperature swings, which cause significant expansion and contraction of the valve seal. Valve seals may have a coefficient of expansion greater than the material comprising the valve housing. Since the seals are usually comprised of incompressible materials and are often captured within a groove or cavity in the valve housing, the seal must be designed so that it can expand within the cavity under high temperature conditions and yet still be deformable so as to accommodate the additional deformations caused by the compressive engagement of the valve closing member necessary to form a fluid tight seal.

A further problem associated with seal design concerns fluid which becomes trapped within the cavity between the seal and the valve housing. This usually occurs when the valve operates under high pressure and the seal deforms upon opening due to transient fluid dynamic forces occasioned by high flow rates within the partially open valve. The deformation of the seal allows the high pressure fluid to seep into the cavity between the seal and the valve housing. This presents problems when the valve closes, as the fluid in the cavity is placed under tremendous pressure as the seal is compressed radially outwardly within the cavity against the housing by the closure member. Without the ability to escape from the cavity, the pressurized fluid deforms the seal, forcing a portion of it radially inwardly from the cavity and into the fluid flow path where it may be pinched by the closure member or dragged by the high speed fluid flow and unseated from the cavity.

Clearly, the design of seals for butterfly valves and the like must take the aforementioned difficulties into consideration if such seals are to operate effectively and with a reasonable life under harsh conditions of high pressure and temperature.

SUMMARY OF THE INVENTION

The invention concerns a seal adapted for use with a valve, such as a butterfly valve, having a rotatable valve closing member mounted within a housing. The seal comprises a flexible, resilient loop, preferably circular in shape and a having perimeter sealing surface and a perimeter mounting surface. The perimeter sealing surface may be positioned on either of the inner or outer perimeters of the loop and faces either inwardly or outwardly from the loop respectively. The perimeter mounting surface is positioned substantially opposite to the perimeter sealing surface and faces in an opposite direction. When the perimeter sealing surface is positioned on the inner perimeter of the loop and faces inwardly, the loop is preferably mounted within a cavity in the housing surrounding the valve closing member. In this configuration, the perimeter mounting surface engages the housing and the perimeter sealing surface extends outwardly from the cavity and engages the valve closing member to seal the valve. Alternately, when the perimeter sealing surface is positioned on the outer perimeter of the loop and faces outwardly, the loop is preferably mounted within a cavity in the valve closing member. In this configuration, the perimeter mounting surface engages the valve closing member and the perimeter sealing surface extends outwardly from the cavity and engages the valve housing to seal the valve.

A first axial surface extends between the perimeter sealing and mounting surfaces and a second axial surface, positioned opposite to the first axial surface, also extends between the perimeter sealing and mounting surfaces. A channel is positioned in one of the axial surfaces and extends from the perimeter mounting surface toward the perimeter sealing surface. Alternately the seal may comprise a plurality of channels positioned in spaced relation from one another on one or both axial surfaces around the loop.

The invention also contemplates a seal, with or without the channels as described above, and further comprising a void space positioned in the perimeter mounting surface. The void space may comprise one or more grooves extending around the perimeter mounting surface, either continuously or intermittently. The void space may also be defined by a raised surface portion extending outwardly from the perimeter mounting surface, or by orienting portions of the perimeter mounting surface at and angle relative to one another.

The invention also includes a valve for controlling fluid flow, the valve comprising a housing and a valve closing member rotatably mounted within the housing. The closuring member is movable between an open position permitting fluid flow through the valve and a closed position preventing the fluid flow. A flexible, resilient loop, preferably circular in shape, is positioned within the housing surrounding the closuring member. The loop has a perimeter sealing surface as described above. Depending upon whether it is positioned on the inner or outer perimeter of the loop, the perimeter sealing surface is engageable with either the valve closing member or the housing for providing a fluid tight seal when the closing member is in the closed position. The loop also has a perimeter mounting surface positioned opposite to the perimeter sealing surface. The perimeter mounting surface is engaged with the other of the closing member and the housing for mounting the loop thereon. A cavity is positioned in either the housing or the valve closing member for receiving the perimeter mounting surface. The perimeter sealing surface extends from the cavity to engage either the valve closing member or the housing to effect a seal. The loop further comprises first and second axial surfaces extending between the perimeter mounting surface and the perimeter sealing surface. The second axial surface is positioned opposite to the first axial surface.

One or more channels may be positioned on one or both of the axial surfaces, the channel extending from the perimeter mounting surface toward the perimeter sealing surface. The seal may further comprise a void space positioned in the perimeter mounting surface as previously described.

DETAILED DESCRIPTION OF EMBODIMENTS

Figure 1:
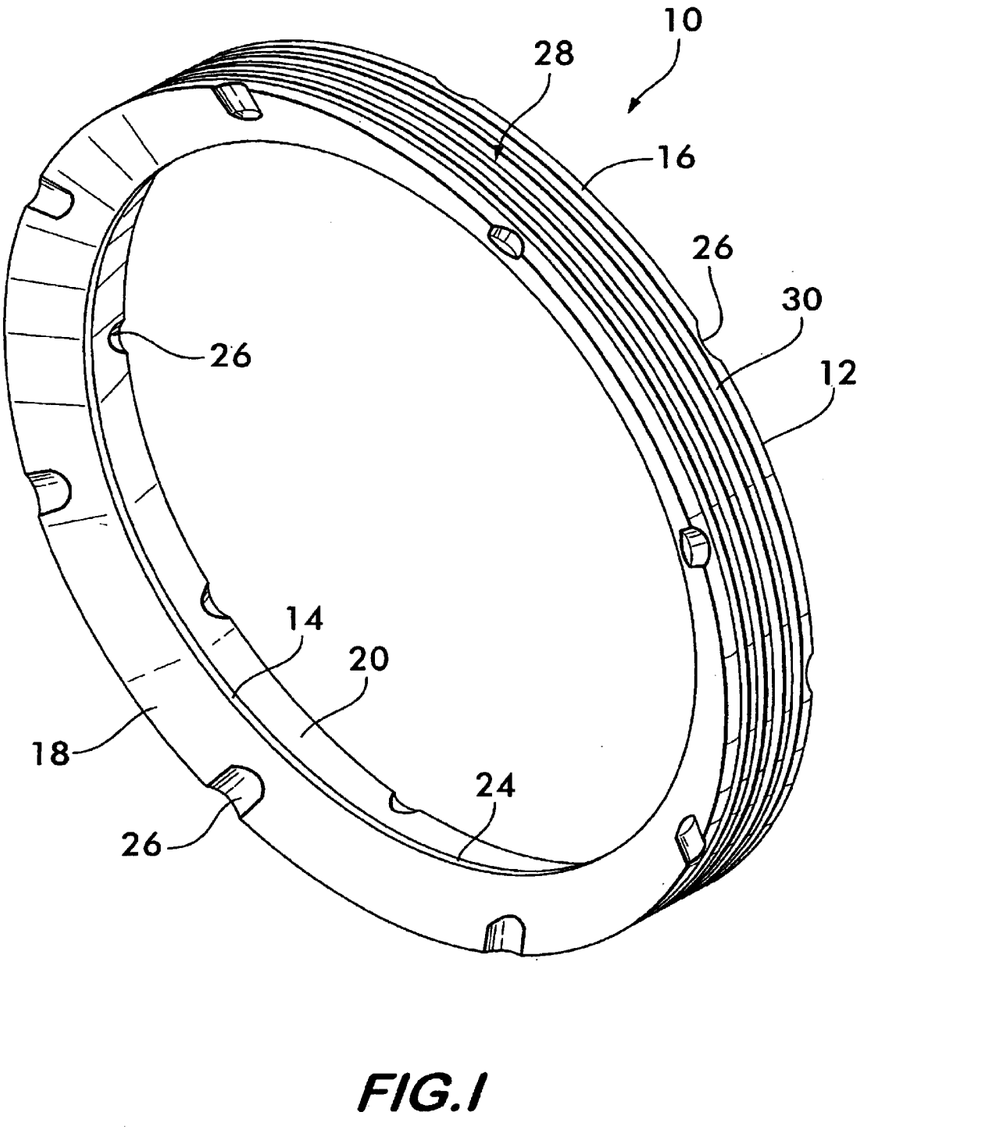
FIG. 1 is a perspective view of a seal according to the invention.
Figure 2:
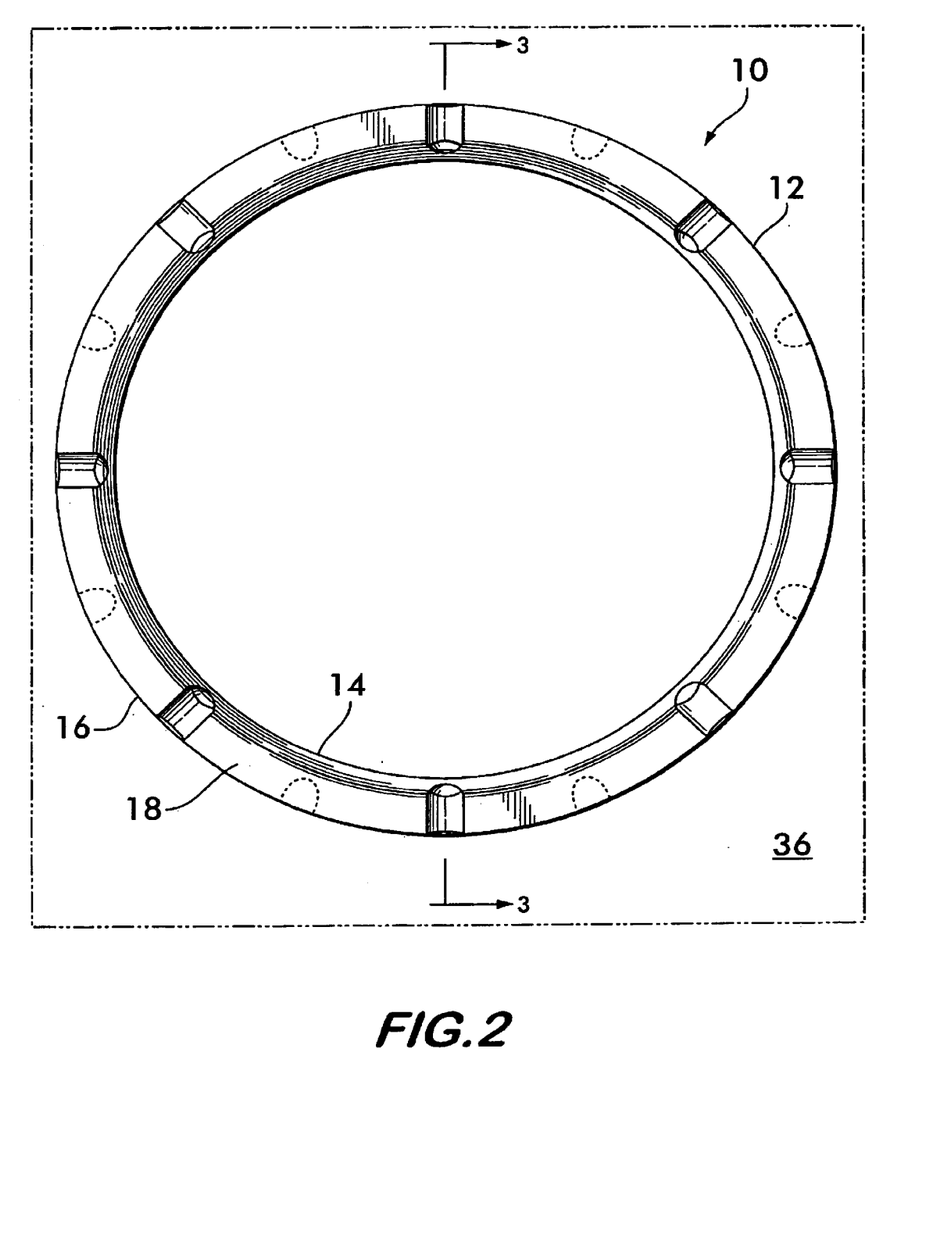
FIG. 2 is a plan view of the seal shown in FIG. 1.

FIGS. 1 and 2 show one embodiment of a seal 10 according to the invention. Seal 10 comprises a loop 12, preferably circular in shape, although other shapes such as oval, ellipsoidal, polygonal and racetrack shaped are also feasible. Loop 12 is flexible and resilient and may comprise elastomeric compounds, natural rubbers as well as thermoplastics such as urethanes. The loop may be formed by compression molding techniques under heat and pressure in a core and cavity type mold or by injection molding techniques when economically justified by large volume production runs.

Figure 3:
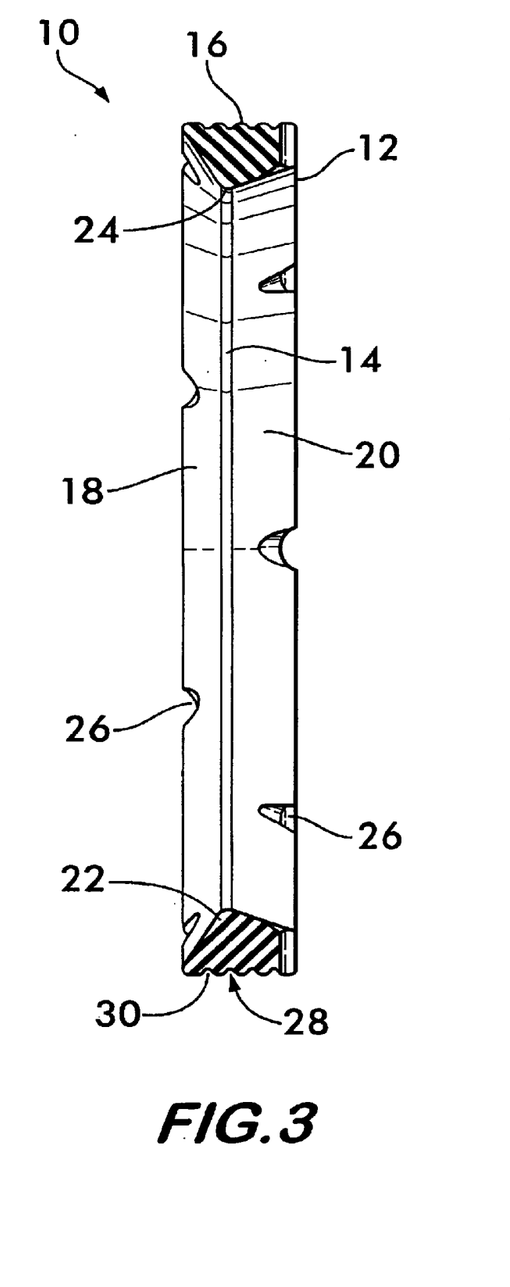
FIG. 3 is a cross-sectional view taken at line 3—3 of FIG. 2.

As best shown in FIGS. 1 and 3, loop 12 has a perimeter sealing surface 14 and a perimeter mounting surface 16 between which extend oppositely disposed axially facing surfaces 18 and 20. Perimeter sealing surface 14 is shown positioned on the inner perimeter of loop 12 facing inwardly of the loop, and perimeter mounting surface 16 is positioned on the outer perimeter of loop 12 and facing outwardly of the loop. As described further below, the relative positions of the sealing and mounting surfaces may be reversed in an alternate embodiment having the perimeter sealing surface on the outer perimeter and facing outwardly, and the perimeter mounting surface on the inner perimeter and facing inwardly (see FIG. 15). Preferably, axial surfaces 18 and 20 are angularly oriented relative to the perimeter sealing surface 14 resulting in a portion 22 of the loop 12 comprising the perimeter sealing surface 14 having a wedge-shaped cross sectional profile. The perimeter sealing surface 14 itself preferably has a curved cross sectional profile 24 adapted to sealingly engage a rotatable closure member of a valve, and the wedge shaped portion 22 is preferably asymmetrical for reasons described in detail below.

As shown in FIGS. 1 and 3, one or more channels 26 are positioned in either or both of the axial surfaces 18 and 20. In the embodiment shown, the channels 26 extend inwardly from the perimeter mounting surface 16 toward the perimeter sealing surface 14. The channels provide fluid communication between the perimeter mounting surface 16 and the perimeter sealing surface 14 when the seal 10 is captured within the housing of a valve (described below) allowing fluid trapped at the perimeter mounting surface 16 to escape back into the fluid flow through the valve.

Figure 4:
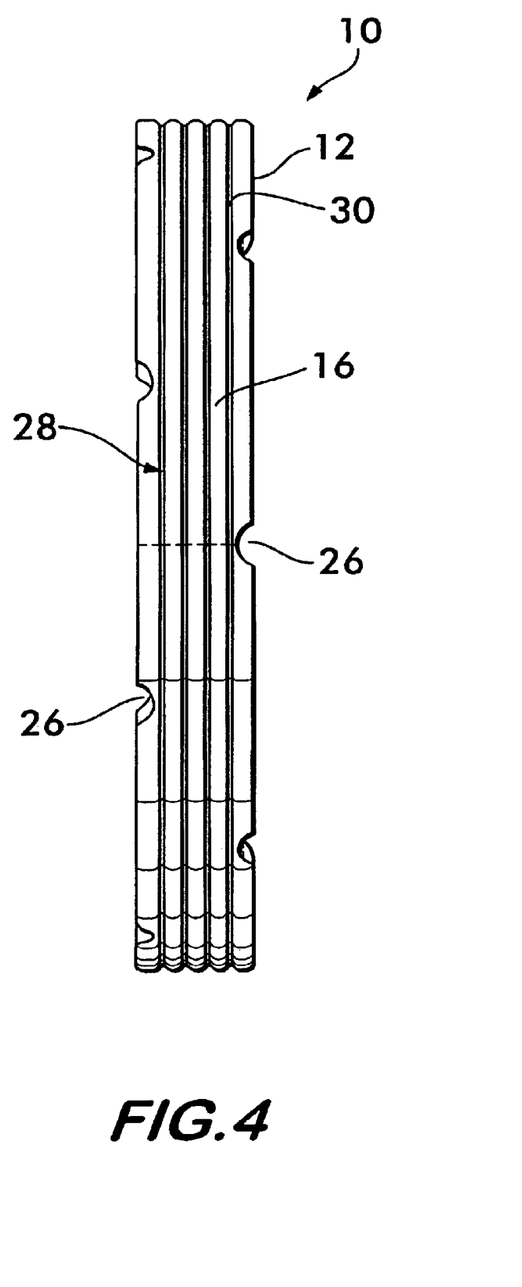
FIG. 4 is a side view of the seal shown in FIG. 1.

As shown in FIGS. 1 and 4, the outwardly facing perimeter mounting surface 16 is adapted to sealingly engage a valve housing (see also FIGS. 5 and 5A) and has a void space generally indicated at 28. The void space 28 serves to provide a free space into which a portion of the loop 12 may deform when the loop is subjected to compression loads. The loop 12 is formed of incompressible material, which means that any deformation which compresses one portion of the loop must be accommodated by a proportional deformation in another part of the loop. When free boundary surfaces, such as 14, 16, 18 and 20 are restrained, as occurs when the seal 10 is mounted in a valve (described in detail below), the void space provides a volume into which portions of the seal may deform to accommodate the compression of other portions of the seal.

Figure 10:
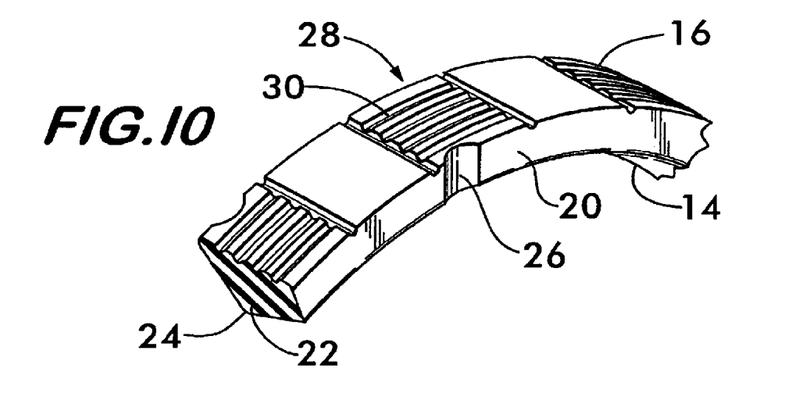
FIGS. 10–14 show various perspective sectional views depicting embodiments of the seal according to the invention.
Figure 11:
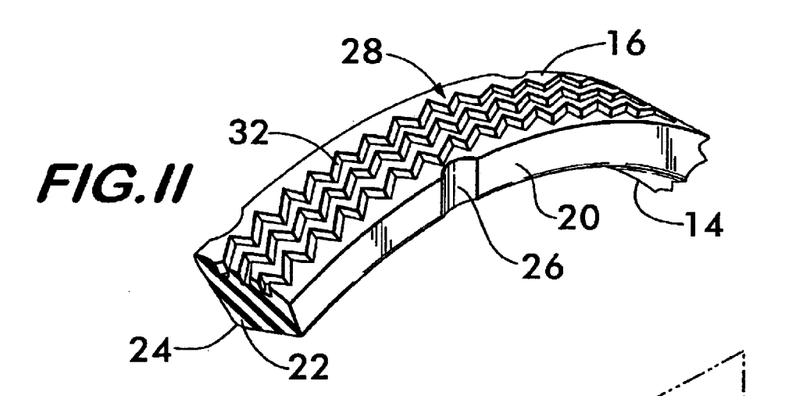
Figure 12:
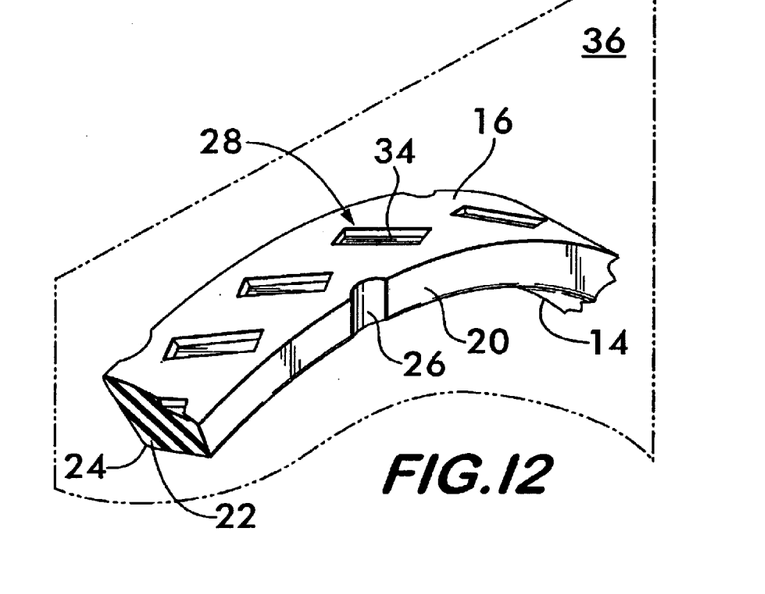
Figure 13:
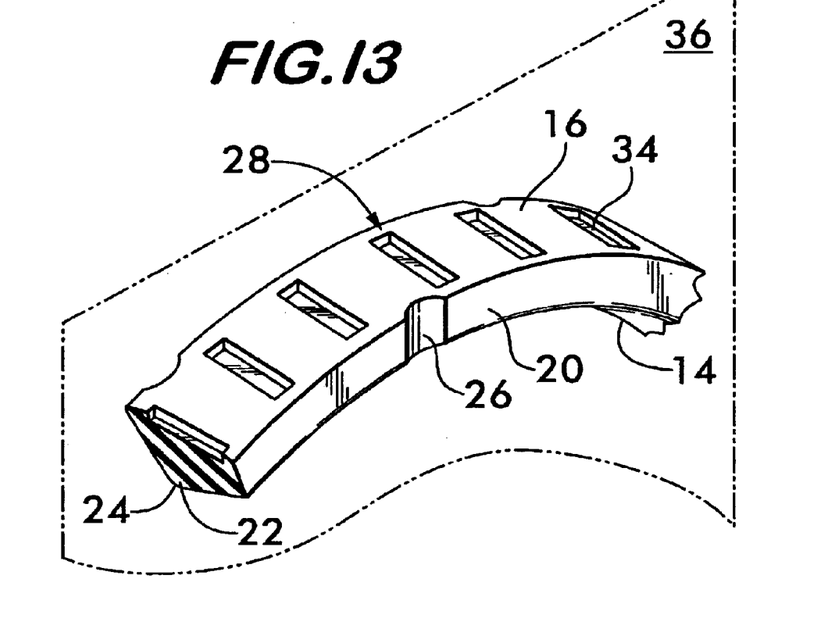
Figure 14:
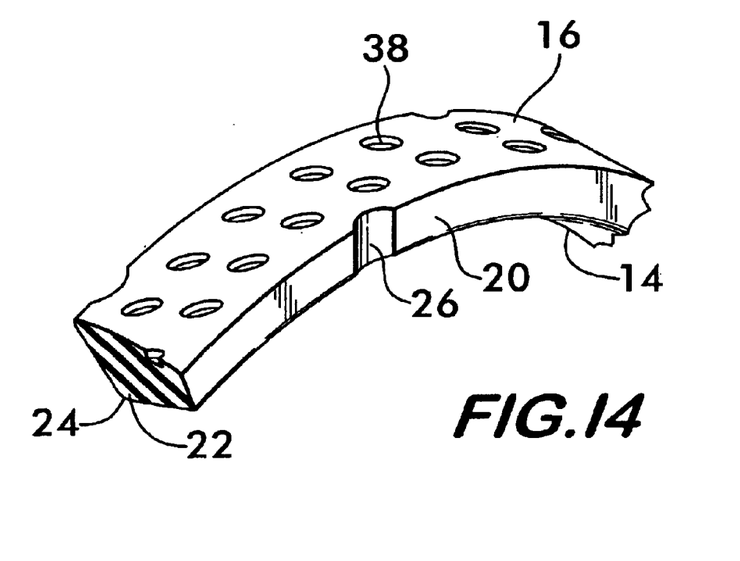

The void space 28 may take a variety of forms or a combination of forms including, for example, one or more grooves 30 extending, either continuously or discontinuously around the perimeter mounting surface 16 (FIGS. 1 and 10, respectively), a zig-zag pattern of grooves 32 (FIG. 11) extending along the perimeter mounting surface 16, multiple grooves 34 oriented transversely to the plane 36 defined by the loop 12 (FIG. 12), the multiple grooves being positionable perpendicularly to the reference plane 36 as well (FIG. 13), or a plurality of dimples 38 (FIG. 14) distributed around the perimeter mounting surface 16.

Figure 6:
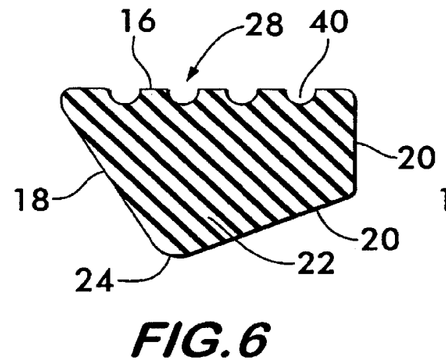
FIGS. 6–9 show various cross sectional views depicting embodiments of the seal according to the invention.
Figure 7:
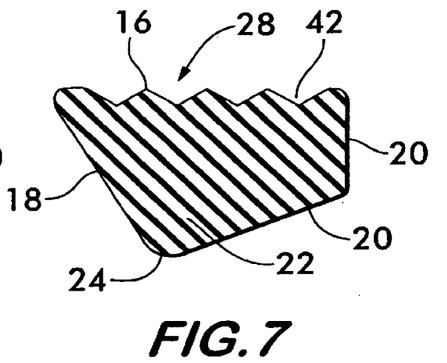
Figure 8:
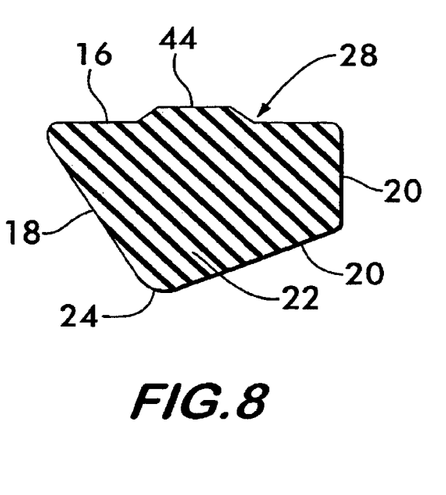
Figure 9:
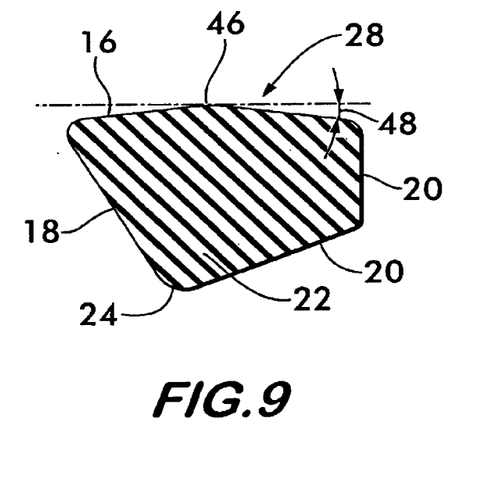

The void space 28 may be defined by any practical cross sectional shape, with FIG. 6 showing curved profiles 40 and FIG. 7 illustrating angled profiles 42 by way of example. As shown in FIG. 8, the void space 28 may also be defined by a single raised surface portion 44 extending outward from the perimeter mounting surface 16, the actual void space being positioned on either side of the raised surface portion. Yet another example of void space 28 is shown in FIG. 9, wherein perimeter mounting surface 16 is given a sloping profile defined by an apex 46 away from which the surface 16 slopes on either side. The angle of slope 48 may be any acute angle with 7° being a practical slope for various applications. The void space itself may be expressed as a percentage of the volume of the seal and its design is determined by numerous parameters including the size of the seal, the coefficient of expansion of the seal material, the coefficient of expansion of the valve material and the temperature range which the valve and seal will experience during valve operation.

Figure 5:
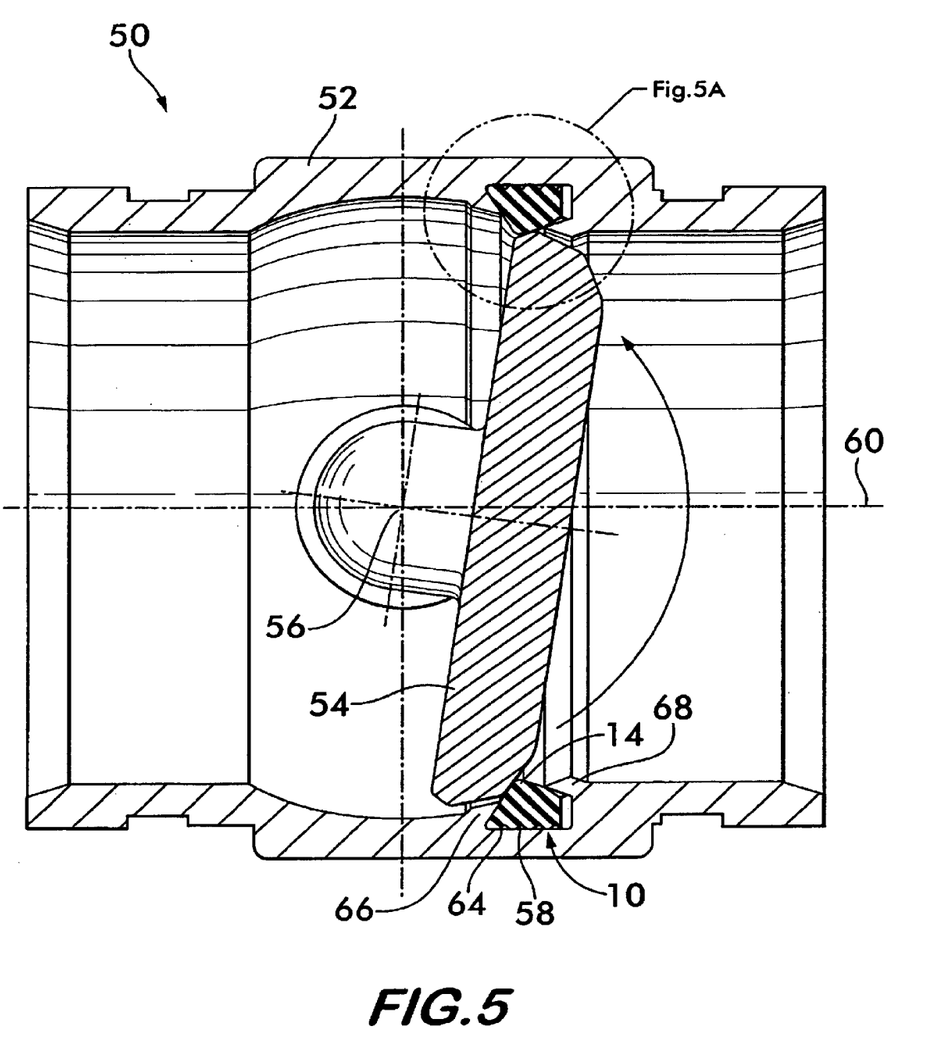
FIG. 5 is a longitudinal sectional view of a valve having a seal according to the invention.

Installation of the seal 10 within a valve 50 is illustrated in FIG. 5. The valve 50 comprises a valve housing 52 comprising one or more components in which a rotatable valve closing member 54 is mounted, the valve closing member being rotatable about an axis 56 between an open and a closed position. In the embodiment illustrated, seal 10 is captured within a circumferential cavity 58 positioned within the valve housing 52. The cavity 58 has a shape substantially complementary to that of seal 10 so as to restrain the seal within the valve housing 52. The perimeter sealing surface 14 extends from the cavity 58 for compressive engagement with the closure member 54 to provide an effective, fluid tight seal when the closure member is rotated transversely to an axis of flow 60 through housing 52.

Figure 5A:
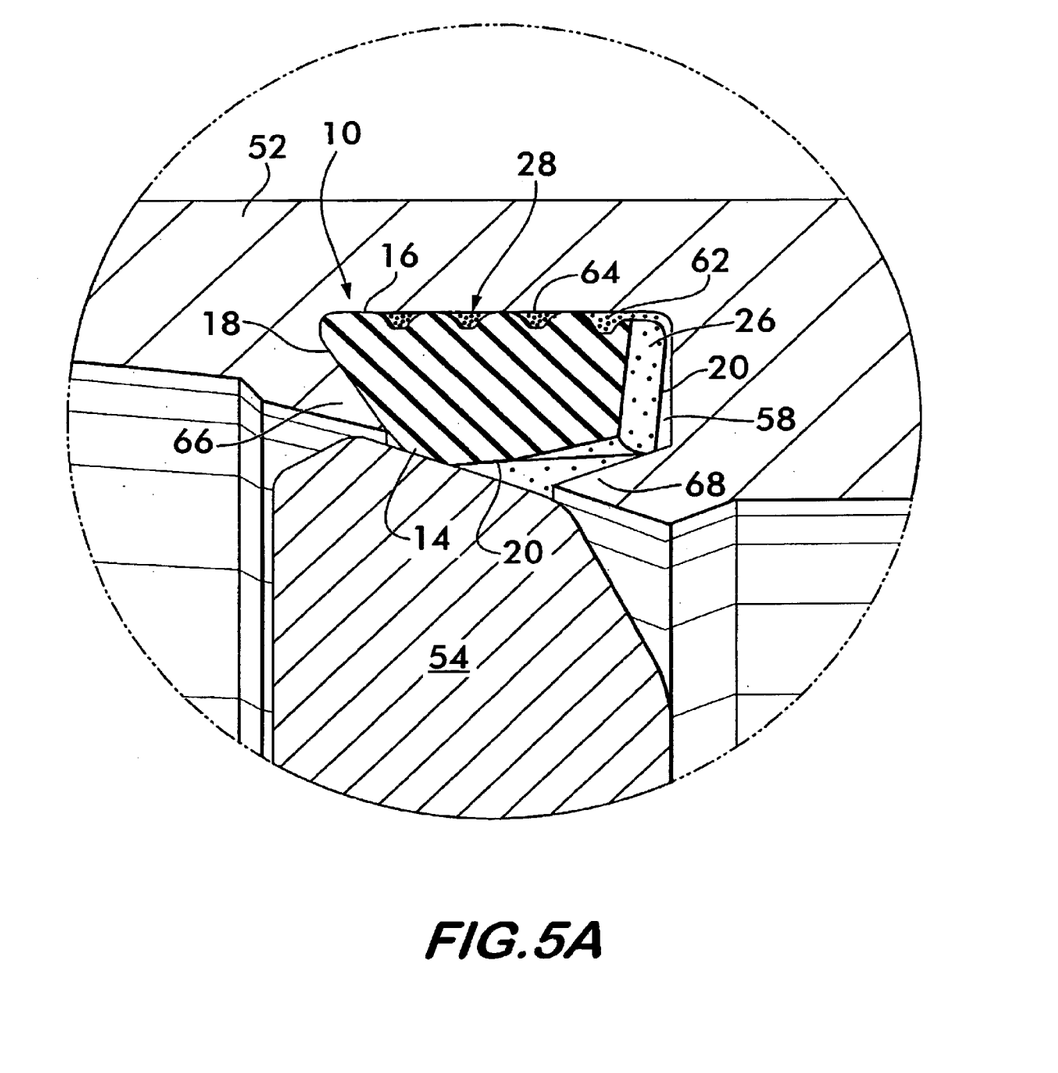
FIG. 5A is a detailed sectional view taken within the circle marked 5A in FIG. 5 and shown on an enlarged scale.

As best shown in FIG. 5A, the complementary shape of cavity 58 to the seal 10 restrains the perimeter mounting surface 16 and the axial surfaces 18 and 20 from significantly deforming in response to compressive deformations of the perimeter sealing surface 14 when engaged by the valve closing member 54. However, the void space 28 in the perimeter mounting surface 16 provides the free space which permits the incompressible seal 10 to deform as required to accommodate compression of the perimeter sealing surface 14. Note that the asymmetry of the perimeter sealing surface 14 allows it to readily accommodate the valve closing member 54, which approaches the perimeter sealing surface 14 from opposite sides simultaneously (see also FIG. 5).

If the perimeter mounting and axial surfaces 16, 18 and 20 were restrained by cavity 58 and void space 28 were not present then it would not be possible to close the valve by compressively deforming the perimeter sealing surface 14. Either the valve would not close because the perimeter sealing surface 14 would not deform or the portions of the housing restraining the seal would yield from the stress imparted by the seal. However, the void space 28 provides free space into which portions of the loop 12 may deform even when the loop is substantially restrained within the valve 50. Valve operation is not the only source of compression force on the seal however. The seal 10 will expand when subjected to heat increasing its temperature. This occurs when a hot fluid flows through the valve for example. If the coefficient of expansion of the seal 10 is greater than that of the valve housing 52 constraining it, then the seal will be subject to compression forces as it tries to expand outwardly against the valve housing. Void space 28 will allow the seal 10 to accommodate these compressive forces without damaging the valve or buckling and unseating from its restraints within cavity 58 as could happen if there were no free space provided into which the incompressible material forming the seal could deform.

During opening of the valve 50, the seal 10 is deformed by its contact with the closure member 54 as well as the transient fluid dynamic forces occasioned by high speed fluid flow through the valve due to the Venturi Effect. Such routine deformation of the seal 10 during valve operation often allows fluid 62 to seep into the cavity 58 and accumulate between the perimeter mounting surface 16 and the floor 64 of the cavity 58 (see FIG. 5A). This accumulated fluid 62 becomes a problem during valve closing. The assembly shown in FIG. 5 comprising the housing 52, closure member 54 and seal 10 may be viewed along axis 60 as a clock face with the axis of rotation 56 of closure member 54 extending between the 6 and 12 o'clock positions. The sectional view of FIG. 5 intersects the 3 o'clock and 9 o'clock positions, with FIG. 5A showing the 3 o'clock position in detail. As the closure member 54 rotates into the closed position, it engages the seal 10 progressively from both the 12 and 6 o'clock positions along the perimeter sealing surface 14 to the 3 and 9 o'clock positions shown in FIGS. 5 and 5A. This progressive engagement of seal 10 displaces the seal, forcing fluid 62 around the perimeter mounting surface 16 eventually to the 3 and 9 o'clock positions. If the fluid 62 has no means of escaping from between the perimeter mounting surface 16 and the cavity floor 64, it may apply a point load on the seal radially inwardly which may cause the seal to buckle and unseat from the cavity 58. The seal 10 may extend significantly into the valve housing 52 and be further dragged out of the cavity by the fluid flow (which also increases in speed during valve closing due to the Venturi Effect) and/or be pinched and damaged by the valve closing member 54 as it rotates to close. The seal 10 may prevent full closure of the valve 50, become damaged and require premature replacement.

As shown in FIG. 5A, channels 26 in axial surfaces 18 and 20 provide a fluid communication path from the perimeter mounting surface 16 which allows trapped fluid 62 to escape as it is compressed between the perimeter mounting surface 16 and the cavity floor 64 during valve closing. The channels 26 may have a length which extends substantially to the perimeter sealing surface 14 clear of cavity 58 so that the fluid 52 can be directed back into the fluid along the axis of flow 60. Alternately, the channels 26 may be covered by the sidewalls 66 and 68 of cavity 58, the channels 26 being exposed to the fluid flow by the deformation of the perimeter sealing surface 14 and axial surfaces 18 and 20 by the closure member 54 as it rotates into the closed position. As each channel is exposed, it provides a pathway from the perimeter mounting surface 16 back to the flow axis 60 within the housing 52 thereby preventing pressure build-up of the fluid 62 and avoiding buckling and unseating of the seal 10.

Figure 15:
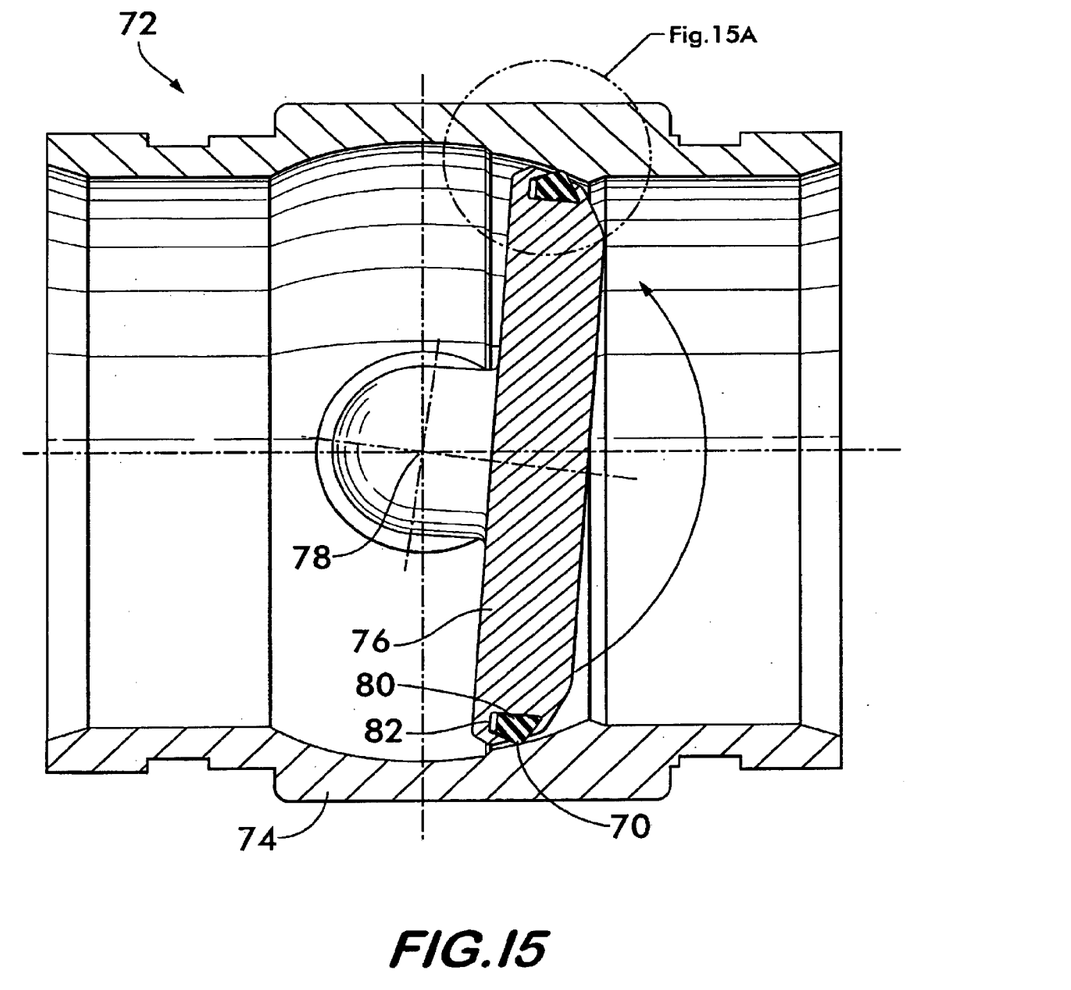
FIG. 15 is a longitudinal sectional view of an alternate embodiment of a valve having a seal according to the invention.

FIG. 15 illustrates another embodiment 70 of a seal according to the invention mounted within a valve 72. Valve 72 comprises a housing 74 in which a valve closing member 76 is rotatably mounted. Valve closing member 76 rotates about an axis 78 between an open and a closed position, the closed position being shown. Seal 70 comprises a loop 80 positioned within a cavity 82 extending around the outer perimeter of valve closing member 76. As shown in detail in FIG. 15A, loop 80 has a perimeter mounting surface 84 positioned on an inner perimeter and facing inwardly of the loop. Perimeter mounting surface 84 sealingly engages a floor 86 of the cavity 82 and has a void space generally indicated at 88. Void space 88 is shown as circumferential grooves 90 in the perimeter mounting surface 84, but may take any of the forms shown in FIGS. 6–14 described above. A perimeter sealing surface 92 is positioned on loop 80 opposite the perimeter mounting surface 84. Perimeter sealing surface 92 is substantially as described previously, but is positioned on an outer perimeter of the loop 80 and faces outwardly, extending from the cavity 82 to engage the housing 74 and effect a seal between it and the valve closing member 76 when the valve closing member is in the closed position shown. Axially facing surfaces 94 and 96 extend between the perimeter sealing surface 92 and the perimeter mounting surface 84. These axial surfaces are captured by sidewalls 98 and 100 defining the cavity 82. Preferably the shape of the cavity 82 and the seal 70 are substantially complementary so that the seal seats securely within the cavity.

Figure 15A:
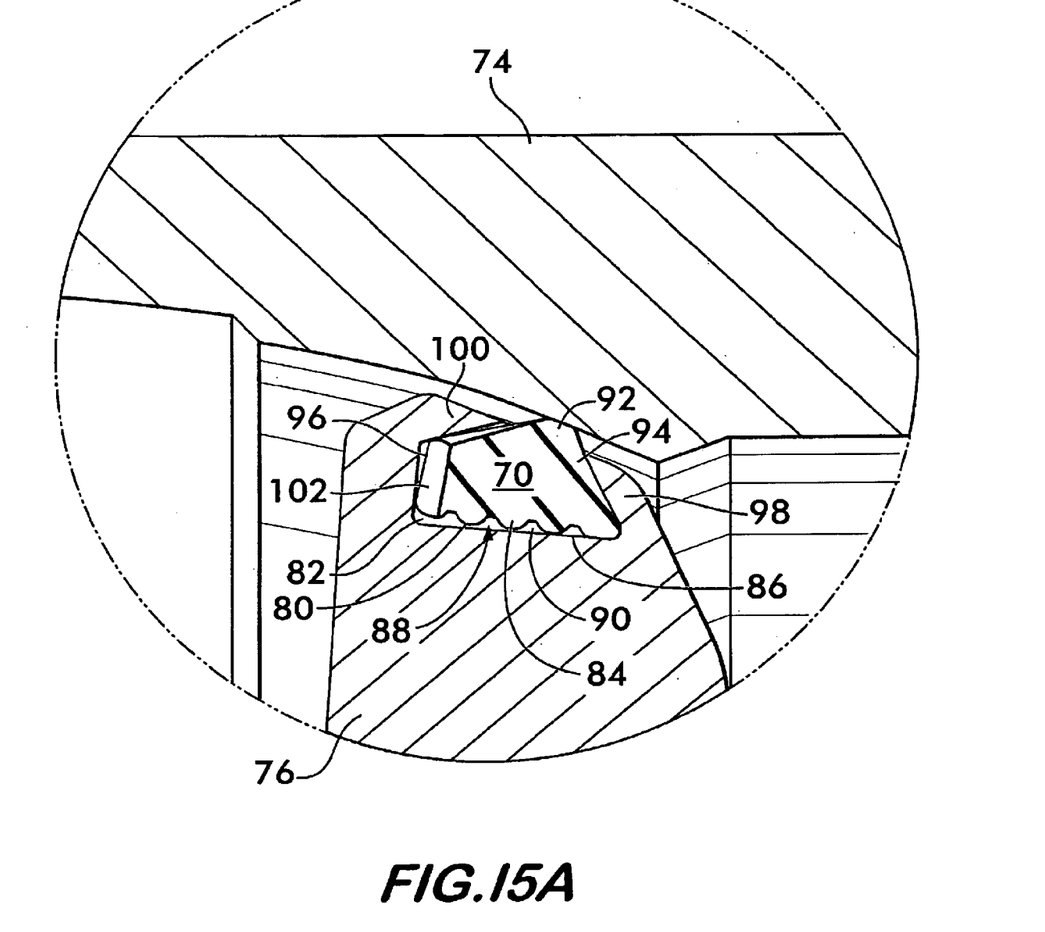
FIG. 15A is a detailed sectional view taken within the circle marked 15A in FIG. 15 and shown on an enlarged scale.

During closing of the valve closing member 76, the perimeter sealing surface 92 is deformed, and the void space 88 compensates for this deformation by allowing other portions of the seal 70 to deform as described above. Due to seal deformation during valve opening, fluid becomes trapped between the perimeter mounting surface 84 and the floor 86 of the cavity 82. Channels 102 are positioned in one or both of the axial surfaces 94 and 96, the channels extending from the perimeter mounting surface 84 toward the perimeter sealing surface 92 and providing fluid communication allowing the fluid to escape and return to the fluid flow stream through the valve.

Seals according to the invention will permit valves, such as butterfly valves, to operate effectively at extremes of temperature and pressure with less likelihood of premature seal failure or valve failure necessitating frequent servicing and its concomitant costs.

What is claimed is:

1. A seal adapted for use with a valve having a valve closing member rotatably mounted within a housing, said seal comprising:
   a flexible, resilient loop having a perimeter sealing surface and a perimeter mounting surface positioned substantially opposite to said perimeter sealing surface, said perimeter sealing surface facing in a first radial direction and being engageable with one of said valve closing member and said housing to sealingly close said valve, said perimeter mounting surface facing in a second radial direction opposite said first radial direction and being engageable with the other of said valve closing member and said housing for mounting said loop within said valve;
   a first surface facing in a first axial direction and extending between said perimeter sealing surface and said perimeter mounting surface;
   a second surface facing in a second axial direction opposite to said first surface and extending between said perimeter sealing surface and said perimeter mounting surface; and
   an open channel extending in a substantially radial direction along one of said first and second surfaces from said perimeter mounting surface toward said perimeter sealing surface.

2. A seal according to claim 1, wherein said perimeter sealing surface faces inwardly of said loop and is engageable with said valve closing member, said perimeter mounting surface facing outwardly of said loop and being engageable with said housing for mounting therein.

3. A seal according to claim 1, wherein said perimeter sealing surface faces outwardly of said loop and is engageable with said housing, said perimeter mounting surface facing inwardly of said loop and being engageable with said valve closing member for mounting thereon.

4. A seal according to claim 1, further comprising a plurality of said open channels positioned in spaced relation from one another on one of said first and second surfaces around said loop.

5. A seal according to claim 1, further comprising a plurality of said open channels positioned on said first and said second surfaces.

6. A seal according to claim 1, wherein said loop is substantially circular in shape.

7. A seal according to claim 6, wherein said perimeter sealing surface has a wedge-shaped cross sectional profile.

8. A seal according to claim 7, wherein said perimeter sealing surface has a curved cross-sectional profile.

9. A seal according to claim 7, wherein said wedge shaped cross section is asymmetrical.

10. A seal according to claim 1, wherein said perimeter mounting surface is configured to define a void space positioned therein.

11. A seal according to claim 10, wherein said void space comprises a groove extending around said perimeter mounting surface.

12. A seal according to claim 11, wherein said groove extends continuously around said entire perimeter mounting surface.

13. A seal according to claim 10, wherein said void space comprises a plurality of grooves extending around said perimeter mounting surface.

14. A seal according to claim 13, wherein said grooves extend continuously around said entire perimeter mounting surface.

15. A seal according to claim 13, wherein said grooves extend around said perimeter mounting surface in a zig-zag pattern.

16. A seal according to claim 10, wherein said void space comprises a plurality of grooves positioned in spaced relation around said perimeter mounting surface, said grooves being oriented transversely to a plane defined by said loop.

17. A seal according to claim 16, wherein said grooves are oriented perpendicular to said plane.

18. A seal according to claim 10, wherein said void space comprises a plurality of dimples positioned in said perimeter mounting surface.

19. A seal according to claim 1, further comprising a raised surface portion extending outwardly from said perimeter mounting surface.

20. A seal according to claim 19, wherein said surface portion extends around said perimeter surface.

21. A seal according to claim 10, wherein said void space is defined by angularly orienting portions of said perimeter mounting surface relative to one another.

22. A seal adapted for use with a valve having a rotatable valve closing member mounted within a housing, said seal comprising:
   a flexible, resilient loop having a perimeter sealing surface and a perimeter mounting surface positioned substantially opposite to said perimeter sealing surface, said perimeter sealing surface facing in a first radial direction and being engageable with one of said valve closing member and said housing to sealingly close said valve, said perimeter mounting surface facing in a second radial direction opposite said first radial direction and being engageable with the other of said valve closing member and said housing for mounting said loop within said valve;
   a first surface facing in a first axial direction and extending between said perimeter sealing surface and said perimeter mounting surface;
   a second surface facing in a second axial direction opposite to said first surface and extending between said perimeter sealing surface and said perimeter mounting surface, an open channel extending in a substantially radial direction along one of said first and said second surfaces from said perimeter mounting surface toward said perimeter sealing surface; and
   said perimeter mounting surface being configured to define a void space therein.

23. A seal according to claim 22, wherein said perimeter sealing surface faces inwardly of said loop and is engageable with said valve closing member, said perimeter mounting surface facing outwardly of said loop and being engageable with said housing for mounting therein.

24. A seal according to claim 22, wherein said perimeter sealing surface faces outwardly of said loop and is engageable with said housing, said perimeter mounting surface facing inwardly of said loop and being engageable with said valve closing member for mounting thereon.

25. A seal according to claim 22, wherein said loop is substantially circular in shape.

26. A seal according to claim 25, wherein said perimeter sealing surface has a curved cross-sectional profile.

27. A seal according to claim 22, wherein said void space comprises a groove extending around said perimeter mounting surface.

28. A seal according to claim 27, wherein said groove extends continuously around said entire perimeter mounting surface.

29. A seal according to claim 22, wherein said void space comprises a plurality of grooves extending around said perimeter mounting surface.

30. A seal according to claim 29, wherein said grooves extend continuously around said entire perimeter mounting surface.

31. A seal according to claim 29, wherein said grooves extend around said perimeter mounting surface in a zig-zag pattern.

32. A seal according to claim 29, wherein said grooves are positioned in spaced relation around said perimeter mounting surface and oriented transversely to a plane defined by said loop.

33. A seal according to claim 32, wherein said grooves are oriented perpendicular to said plane.

34. A seal according to claim 22, wherein said void space comprises a plurality of dimples positioned in said perimeter mounting surface.

35. A seal according to claim 34, wherein said dimples are positioned in spaced relation around said perimeter mounting surface.

36. A seal according to claim 22, wherein said void space is defined by a raised surface portion extending outwardly from said perimeter mounting surface, said void space being adjacent to said raised surface portion.

37. A seal according to claim 36, wherein said raised surface portion extends around said perimeter mounting surface.

38. A seal according to claim 22, wherein said void space is defined by angularly orienting portions of said perimeter mounting surface relative to one another.

39. A seal according to claim 22, further comprising a plurality of said open channels positioned in spaced relation from one another on one of said first and second surfaces around said loop.

40. A seal according to claim 22, further comprising a plurality of said open channels positioned on said first and said second surfaces.

41. A valve for controlling fluid flow, said valve comprising:
   a housing;
   a valve closing member rotatably mounted within said housing and movable between an open position permitting fluid flow through said valve, and a closed position preventing said fluid flow; and
   a flexible, resilient loop positioned within said housing surrounding said closing member, said loop having a perimeter sealing surface facing in a first radial direction and engageable with one of said closing member and said housing for providing a fluid tight seal therebetween when said closing member is in said closed position, said loop having a perimeter mounting surface facing in a second radial direction opposite said first radial direction and being engageable with the other of said closing member and said housing for mounting said loop thereon, said loop further comprising first and second surfaces extending between said perimeter mounting surface and said perimeter sealing surface, said first surface facing in a first axial direction and said second surface facing in a second axial direction opposite to said first surface, an open channel extending in a substantially radial direction along one of said first and said second surfaces from said perimeter mounting surface toward said perimeter sealing surface.

42. A valve according to claim 41, further comprising a cavity positioned within said housing substantially surrounding said valve closing member, said perimeter mounting surface facing outwardly of said loop and being positioned within said cavity for mounting therein, said perimeter sealing surface facing inwardly of said loop and extending from said cavity for engagement with said valve closing member.

43. A valve according to claim 41, further comprising a cavity positioned within and substantially surrounding said valve closing member, said perimeter mounting surface facing inwardly of said loop and being positioned within said cavity for mounting therein, said perimeter sealing surface facing outwardly of said loop and extending from said cavity for engagement with said housing.

44. A valve according to claim 41 wherein said loop further comprises a plurality of said open channels positioned in spaced relation from one another in said one surface around said loop.

45. A valve according to claim 41 wherein said loop further comprises a plurality of said open channels positioned in said first and said second surfaces.

46. A valve according to claim 41, wherein said perimeter mounting surface is configured to define a void space positioned therein.

47. A valve according to claim 46, wherein said void space comprises a groove extending around said perimeter mounting surface.

48. A valve according to claim 47, wherein said groove extends continuously around said entire perimeter mounting surface.

49. A valve according to claim 46, wherein said void space comprises a plurality of grooves extending around said perimeter mounting surface.

50. A valve according to claim 49, wherein said grooves extend continuously around said entire perimeter mounting surface.

51. A valve according to claim 49, wherein said grooves extend around said perimeter mounting surface in a zig-zag pattern.

52. A valve according to claim 46, wherein said void space comprises a plurality of grooves positioned in spaced relation around said perimeter mounting surface, said grooves being oriented transversely to a plane defined by said loop.

53. A valve according to claim 52, wherein said grooves are oriented perpendicular to said plane.

54. A valve according to claim 46, wherein said void space comprises a plurality of dimples positioned in said perimeter mounting surface.

55. A valve according to claim 46, wherein said void space is defined by a raised surface portion extending outwardly from said perimeter mounting surface, said void space being adjacent to said raised surface portion.

56. A valve according to claim 55, wherein said raised surface portion extends around said perimeter mounting surface.

57. A valve according to claim 46, wherein said void space is defined by angularly orienting portions of said perimeter mounting surface relative to one another.

58. A valve for controlling fluid flow, said valve comprising:
   a housing;
   a valve closing member rotatably mounted within said housing and movable between an open position permitting fluid flow through said valve, and a closed position preventing said fluid flow; and
   a flexible, resilient loop positioned within said housing surrounding said closing member, said loop having a perimeter sealing surface facing in a first radial direction and engageable with one of said closing member and said housing for providing a fluid tight seal therebetween when said closing member is in said closed position, said loop having a perimeter mounting surface facing in a second radial direction opposite said first radial direction and being engageable with the other of said closing member and said housing for mounting said loop thereon, said loop further comprising first and second surfaces extending between said perimeter mounting surface and said perimeter sealing surface, said first surface facing in a first axial direction and said second surface facing in a second axial direction opposite to said first surface, an open channel extending in a substantially radial direction along one of said first and said second surfaces from said perimeter mounting surface toward said perimeter sealing surface, said perimeter mounting surface being configured to define a void space therein.

59. A valve according to claim 58, further comprising a cavity positioned within said housing substantially surrounding said valve closing member, said perimeter mounting surface facing outwardly of said loop and being positioned within said cavity for mounting therein, said perimeter sealing surface facing inwardly of said loop and extending from said cavity for engagement with said valve closing member.

60. A valve according to claim 58, further comprising a cavity positioned within and substantially surrounding said valve closing member, said perimeter mounting surface facing inwardly of said loop and being positioned within said cavity for mounting therein, said perimeter sealing surface facing outwardly of said loop and extending from said cavity for engagement with said housing.

61. A valve according to claim 58, wherein said void space comprises a groove extending around said perimeter mounting surface.

62. A valve according to claim 61, wherein said groove extends continuously around said entire perimeter mounting surface.

63. A valve according to claim 58, wherein said void space comprises a plurality of grooves extending around said perimeter mounting surface.

64. A valve according to claim 63, wherein said grooves extend continuously around said entire perimeter mounting surface.

65. A valve according to claim 63, wherein said grooves extend around said perimeter mounting surface in a zig-zag pattern.

66. A valve according to claim 63, wherein said grooves are positioned in spaced relation around said perimeter mounting surface and oriented transversely to a plane defined by said loop.

67. A valve according to claim 66, wherein said grooves are oriented perpendicular to said plane.

68. A valve according to claim 58, wherein said void space comprises a plurality of dimples positioned in said perimeter mounting surface.

69. A valve according to claim 68, wherein said dimples are positioned in spaced relation around said perimeter mounting surface.

70. A valve according to claim 58, wherein said void space is defined by a raised surface portion extending outwardly from said perimeter mounting surface, said void space being adjacent to said raised surface portion.

71. A valve according to claim 70, wherein said raised surface portion extends around said perimeter mounting surface.

72. A valve according to claim 58, wherein said void space is defined by angularly orienting portions of said perimeter mounting surface relative to one another.

73. A valve according to claim 58, further comprising a plurality of said open channels positioned in spaced relation from one another on said one surface around said loop.

74. A valve according to claim 58, further comprising a plurality of said open channels positioned on said first and said second surfaces.

* * * * *

UNITED STATES PATENT AND TRADEMARK OFFICE
CERTIFICATE OF CORRECTION

PATENT NO.         : 6,938,879 B2
APPLICATION NO. : 10/635087
DATED                  : September 6, 2005
INVENTOR(S)       : Bancroft et al.

It is certified that error appears in the above-identified patent and that said Letters Patent is hereby corrected as shown below:

Column 8, lines 13 and 14, claim 20 should read,

20. A seal according to claim 19, wherin said raised surface portion extends around said perimeter mounting surface.

Signed and Sealed this

Thirty-first Day of October, 2006

JON W. DUDAS
*Director of the United States Patent and Trademark Office*